C. S. VADNER.
APPARATUS FOR ARRESTING SMELTER FUMES AND RECOVERING THEIR VALUES.
APPLICATION FILED FEB. 10, 1913.
1,085,712.
Patented Feb. 3, 1914.
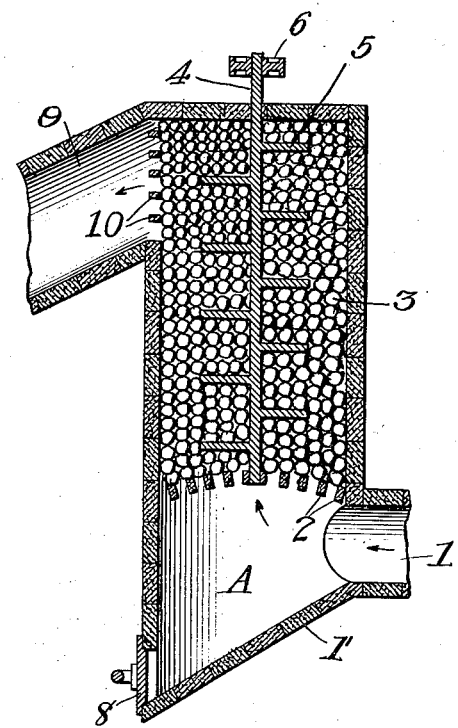

UNITED STATES PATENT OFFICE.

CHARLES S. VADNER, OF SALT LAKE CITY, UTAH.

APPARATUS FOR ARRESTING SMELTER-FUMES AND RECOVERING THEIR VALUES.

1,085,712.　　　　Specification of Letters Patent.　　Patented Feb. 3, 1914.

Application filed February 10, 1913. Serial No. 747,577.

*To all whom it may concern:*

Be it known that I, CHARLES S. VADNER, a citizen of the United States, and a resident of Salt Lake City and county, State of Utah, have discovered a new and useful Apparatus for Arresting Smelter-Fumes and Recovering their Values.

My invention is one by which smelter fumes may be rendered harmless and thereafter liberated into the atmosphere or be transformed into gases for power purposes. By the use of the apparatus in this specification, I recover the valuable solids contained in the said fumes.

The object of my invention is to so mechanically treat the noxious fumes evolved by various smelting operations that they may be put through the apparatus without rendering the same inoperative by reason of the mechanical impurities that would otherwise be contained therein.

I accomplish this object by means of the apparatus illustrated in the accompanying drawing, in which the figure is a sectional view of my apparatus in which the mechanical filtering is carried out.

The fumes coming from the smelter flues are led through the intake flue 1 into the recovery tower A. Said recovery tower has a sloping bottom 1' sloping away from the intake flue and above the entrance of the intake flue there is a grate made of chemical bricks 2 set with suitable apertures entirely across the base of the recovery tower. Resting upon the said grate are a number of small hollow iron shells, Greenland pebbles or other spherical bodies 3 of suitable size and character. The openings of the grate 2 and the upper grate 10 are smaller than the diameter of the bodies 3. In the center of the recovery tower is a rotary stirrer 4 having stirring arms 5 at suitable intervals and provided with the pulley 6 or other suitable means for the operation of the same outside of the recovery tower. These shells, pebbles or bodies completely fill said recovery tower, and are prevented from falling into the outlet 9 by the grate 10 which is composed of chemical bricks insoluble by acids, set at suitable intervals across the opening in the said outlet. The fumes percolating upward through the irregular apertures between the shells or pebbles lose all their mechanical impurities, which become disposed in the interstices between the shells or other bodies. The rotary stirrer 4 is rotated by the means provided and by agitating the shells or pebbles in the tower, the mechanical impurities consisting of gold, silver, and other valuable metals are permitted to fall down through the spaces in the brick grate to the sloping floor 1', thence they may be drawn off through the manhole 8 and returned to the smelter for the recovery of their valuable constituents.

By this apparatus all their mechanical impurities are filtered from the fumes preparatory to their passing onward through outlet 9 into the other gas treatment apparatus.

Having thus described my invention what I claim as new and desire to secure by Letters Patent is:

An apparatus for purifying smelter fumes, comprising a tower provided with a traverse partition wall forming a chamber above and below it, a filtering body, composed of pieces of insoluble solid material in said tower, above said wall, an agitator in the upper portion of said tower adapted to agitate the filtering bodies, and by such agitation to cause the particles of solid matter carried off by the smelter fumes, to drop to the bottom, said partition wall being provided with openings of such size as to permit such solid particles to pass therethrough, but retaining the filtering bodies, and means for the entrance of said smelter fumes below the said partition wall, said tower having an inclined bottom, and means for the removing of the filtered particles from the bottom of said chamber, substantially as described.

In witness whereof I have hereunto set my hand this 5th day of February, 1913.

CHARLES S. VADNER.

Witnesses:
　R. C. FARNOW,
　F. B. SCOTT.